UNITED STATES PATENT OFFICE.

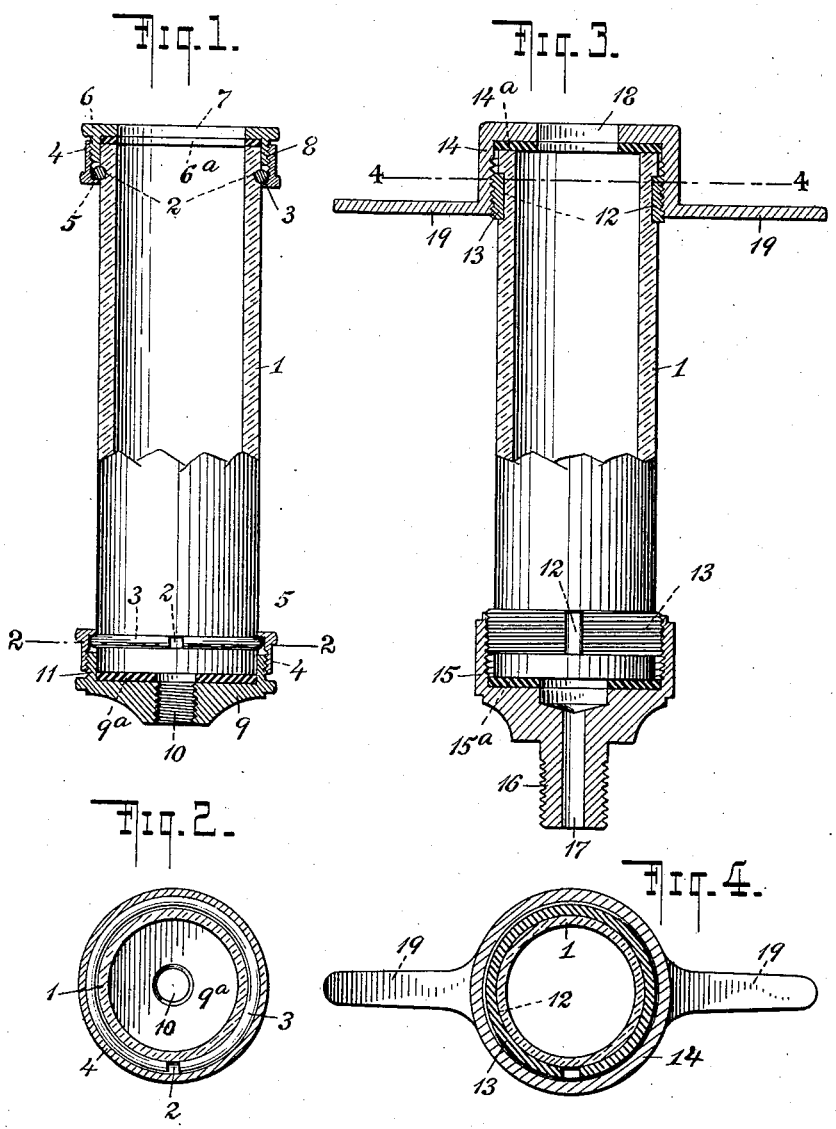

ALFRED ROESCH, OF NEW YORK, N. Y., ASSIGNOR TO CHARLES J. TAGLIABUE MANUFACTURING CO., OF NEW YORK, N. Y., A CORPORATION OF NEW YORK.

MEANS FOR ATTACHING METALLIC FIXTURES TO CYLINDRICAL ELEMENTS OF GLASS OR LIKE MATERIAL.

1,033,196.  Specification of Letters Patent.  Patented July 23, 1912.

Application filed January 22, 1910. Serial No. 539,582.

*To all whom it may concern:*

Be it known that I, ALFRED ROESCH, a citizen of the United States, and resident of Brooklyn, county of Kings, city and State of New York, have invented certain new and useful Improvements in Means for Attaching Metallic Fixtures to Cylindrical Elements of Glass or Like Material, of which the following is a specification.

My invention relates to means for attaching metallic fixtures to cylindrical elements of glass or like material and has for its object to provide a simple and effective means of this kind which may be readily and quickly attached to or removed from said cylindrical elements.

My invention is particularly adapted for removably securing the metallic parts such as caps, nipples, etc., to glass syringe barrels and does away with the necessity for screw-threading said barrels and is readily applied to drawn glass tubes. The most perfect barrels of this kind are secured by drawing the glass into tubular form instead of molding same, said drawn tubes, however, being extremely hard to screw-thread owing to the fragile nature of the glass. Thus many barrels or cylinders are broken during the screw-threading operation and even in those sucessfully screw-threaded, the threads are easily chipped and broken for instance by screwing the cap or nipples too tightly. The cost of manufacture of such cylinders or barrels is thus very high and the maximum life thereof very short.

The particular object of my invention is to overcome these difficulties and objections and to provide a means which will be effective for the purpose intended and which is not easily disarranged or broken.

My invention will be fully described hereinafter and the features of novelty will be pointed out in the appended claim.

Reference is to be had to the accompanying drawings in which—

Figure 1 is a longitudinal section partly in exterior of one form of my invention; Fig. 2 is a horizontal section thereof on the line 2—2 of Fig. 1; Fig. 3 is a longitudinal section partly in exterior of another form of my improvement and Fig. 4 is a sectional view thereof on the line 4—4 of Fig. 3.

Referring more particularly to Figs. 1 and 2 in which I have illustrated my invention applied to a syringe, 1 is the cylindrical tubular barrel which is provided at points near its opposite ends with annular grooves 2. A split metallic ring 3 is sprung into each of these grooves and is maintained in position thereby against movement in the direction of the axis of the barrel. The grooves 2 are each of such a depth and the rings 3 of such a size, that said rings will project beyond the exterior surface of the barrel when in position in the grooves so as to form annular projections on said barrel near each end thereof.

4 are internally screw-threaded collars each provided with an inwardly extending annular flange 5 adapted to engage the projecting portion of the rings 3. It is to be understood that said collars are capable of a longitudinal as well as a rotative movement relatively to the barrel 1 and that the interior diameter of the screw-threaded portion thereof is greater than the greatest outside diameter of said barrel, so that when said collars are in position on the barrel the screw-threaded portion will be spaced from the exterior surface of said barrel. An upper cap 6 having the usual central aperture 7 for the accommodation of the customary piston rod is provided with a screw-threaded flange 8 adapted to extend into the space between the collar and the barrel and to engage the screw-threaded portion of said collar as clearly shown in Fig. 1 of the drawings. 9 is a similar cap, having an internally screw-threaded aperture 10 adapted to receive the ordinary nipple for the accommodation of the customary hypodermic needle and provided with a similar flange 11 arranged to engage the opposite collar 4 in the same way. Thus as the collar 4 and caps 6 and 9 are rotated relatively to each other the flanges 5 of said collars will be gradually drawn toward the projecting portion of the rings 3 and will finally abut against said rings. A continued rotation of either the caps 6 and 9 or the collars 4 will cause the caps to be drawn against the opposite ends of the barrel and the flanges 5 against the rings 3 and will consequently firmly lock these parts in position on the barrel. Suitable packing rings $6^a$ and $9^a$ may be provided between each cap 6 and 9 and the respective ends of the barrel 1.

In the form of my invention shown in

Figs. 3 and 4 the barrel 1 is provided with annular grooves 12 near each end thereof in each of which a split ring 13 is sprung in the same way as shown and described with regard to Figs. 1 and 2 of the drawings. These rings 13 are of considerable width and have their exterior peripheries provided with screw-threads adapted to receive either the internally screw-threaded cap 14 or the cap 15 provided with the screw-threaded nipple 16. The said nipple 16 and cap 15 are provided with a passage 17 which establishes communication between the interior of the syringe barrel and the customary needle which is screwed upon said nipple 16. The cap 14 which engages the ring 13 at the opposite end of the barrel 1 is provided with a central aperture 18 for the accommodation of the piston rod and further is provided with the oppositely extending finger pieces 19. The cap 14 and these finger pieces are drawn out in one piece from sheet metal, said finger pieces projecting from the cap at its lowermost periphery. By making this cap and the finger pieces integral with each other from a single piece of sheet metal the use of solder is done away with and a more substantial and cheaper structure is secured than in structures in which the finger pieces are separate elements from the cap and which caps have heretofore always been made from bar metal. It is to be understood that the screw-threaded rings 13 hug the barrel of the syringe with a sufficient degree of pressure to be maintained against rotation while the caps 14 and 15 are screwed into operative position. If desired both forms of rings may be fixed in their respective grooves in any suitable manner as for instance by cementing although this is not absolutely necessary.

While I have described and illustrated my invention as applied to syringe barrels, it is to be distinctly understood that both forms thereof may be adapted for securing metallic fixtures for instance upon glass curtain or towel rods, or any other cylindrical rods made of glass or similar material and the claim is to be construed accordingly.

My invention is particularly adapted for use in connection with glass syringe barrels which must have a smooth inside surface and are consequently drawn and not molded, as it does away with the necessity for screw-threading barrels of this description. As stated in the preamble, owing to the fragile nature of such syringe barrels a great many are broken during the screw-threading operation so that the cost of production is high. Furthermore even if successfully screwthreaded, the threads are easily broken and chipped, thus rendering the barrel useless and making the life thereof extremely short. Both forms of my invention overcome these objections as it is only necessary to circumferentially groove said barrels, and then spring the split rings into position, both the grooving and applying of the rings being simple operations easily accomplished. 14$^a$ and 15$^a$ are packing rings similar to the rings 6$^a$ and 9$^a$.

Various changes may be made in the specific constructions shown and described within the scope of the claim without departing from the spirit of my invention.

I claim as my invention:

The combination of a tubular syringe barrel having an annular groove near each end, a resilient split ring located in each groove and projecting beyond the outer surface of said barrel, caps, each comprising an externally screw-threaded portion having a sliding engagement with the outer surface of said syringe barrel and an inwardly extending flange adapted to abut against each end surface of said barrel, internally screw-threaded collars arranged to screw over the externally screw-threaded portion of each cap, and an annular inwardly extending flange on each collar, having a sliding engagement with said syringe barrel and arranged to abut against the projecting portion of each ring.

In testimony whereof I have signed my name to this specification in the presence of two subscribing witnesses.

ALFRED ROESCH.

Witnesses:
JOHN A. KEHLENBECK,
LOUIS ALEXANDER.